United States Patent [19]
Plifka

[11] Patent Number: 4,538,827
[45] Date of Patent: Sep. 3, 1985

[54] BALL HITCH TRAILER LOCK

[76] Inventor: John W. Plifka, 5412 - 26th Ave. South, Minneapolis, Minn. 55417

[21] Appl. No.: 601,071

[22] Filed: Apr. 16, 1984

[51] Int. Cl.³ .................... B60R 25/00; E05B 73/00
[52] U.S. Cl. ...................................... 280/507; 70/14; 70/57; 70/58; 70/258
[58] Field of Search ............... 280/507, 504, 511, 514; 70/58, 14, 57, 258

[56] References Cited

U.S. PATENT DOCUMENTS 3,391,555 7/1968 Mamo .................................. 70/258
3,884,055 5/1975 Vuillemot ............................. 70/58

FOREIGN PATENT DOCUMENTS 2458410 2/1981 France ................................ 280/507
1334940 10/1973 United Kingdom .................... 70/14

Primary Examiner—Joseph F. Peters, Jr.
Assistant Examiner—Mitchell J. Hill
Attorney, Agent, or Firm—Orrin M. Haugen; Thomas J. Nikolai; Douglas L. Tschida

[57] ABSTRACT

Anti-theft apparatus for protecting an uncoupled trailer, including a portion mountable within the ball receiving end of a trailer and also including a U-shaped member and a draw bar insertable through the legs thereof for securing the assembly to the trailer tongue. A housing formed on one side of the U-shaped member protects a padlock secured to a slot in the dead bolt.

5 Claims, 4 Drawing Figures

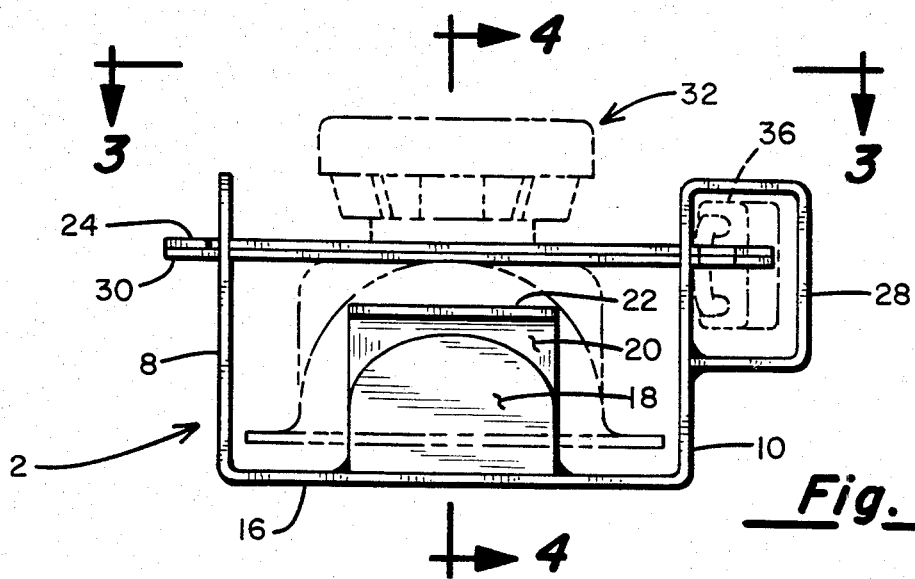
_Fig. 2_
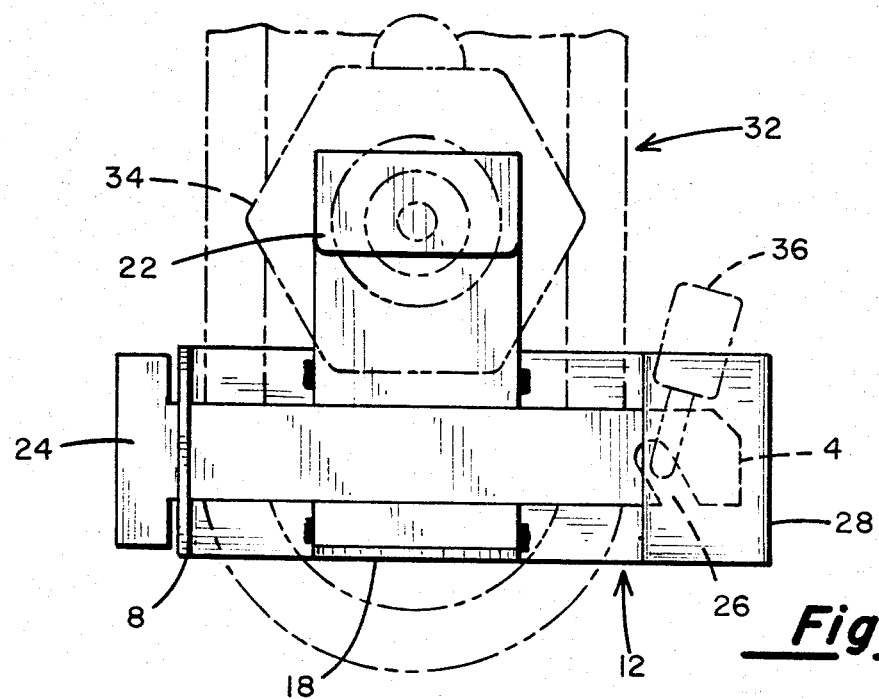
_Fig. 3_
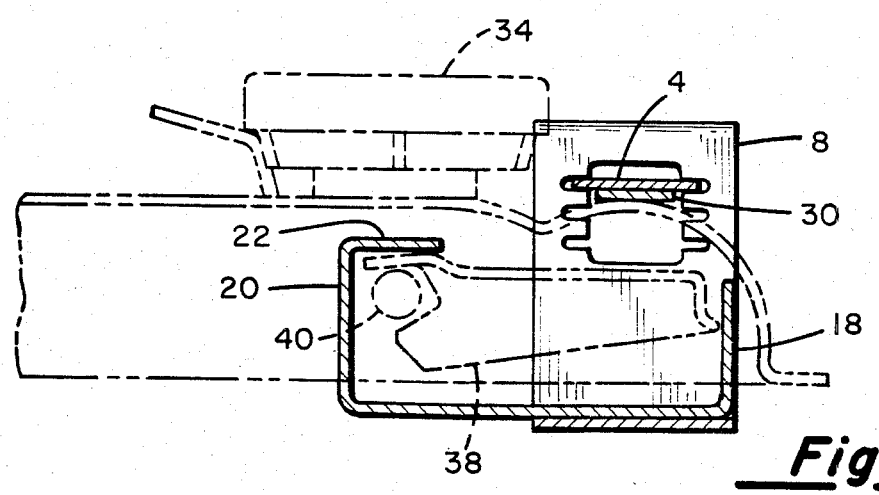
_Fig. 4_

BALL HITCH TRAILER LOCK

BACKGROUND OF THE INVENTION

The present invention relates to ball-type trailer hitch couplers and, in particular, to an anti-theft assembly that may be coupled to the hitch coupler of an unattended trailer to prevent against unauthorized tow away.

A problem long plaguing the owners of ball-type trailers for utility trailerable equipment, including boats, camping trailers and the like has been that of protecting the trailer against theft by unauthorized tow away, when the trailer is not coupled and locked to the towing vehicle. In an uncoupled condition, the trailer is always suspectible of theft and, therefore, requires that one must park the trailer in an attended area so as to permit observation and thereby lessen the risk of theft. This, however, is not always practicable such as during camping or boating expeditions where the trailer is not always attended. Therefore, a need exists for a device to prevent theft by merely securing the trailer to a mating ball on an unauthorized vehicle.

One attempt at such a device can be found upon directing attention to British Pat. No. 1,350,086 and wherein a U-shaped member having a ball-type projection and padlocked draw bar is shown for mounting about and securing the end of a ball-type trailer. Problems attendant with such a device, however, arise in that the projection contemplated requires a different locking assembly for each differently sized trailer tongue and which commonly are compatible either with a 1⅞ inch or a 2 inch diameter ball. Additional problems with this early device arises from the exposing of the padlock to bolt cutters and the general configuration of the U-shaped member and draw bar and which are such as to permit the decoupling of the assembly from the trailer by a variety of prying or hammering instruments. This lock arrangement is readily defeated by merely forcing the rotation of the U-shaped bracket forward over the end of the trailer hitch coupler itself.

It is, therefore, a primary object of the present invention to achieve a locking device that is compatible with all commonly found sizes of trailer tongues and which prevents removal by either prying or the cutting of an associated padlock.

A further object is to develop a locking device that may be adjustably snugged to any trailer tongue so as to minimize dimensional differences and also to facilitate the coupling of the padlock to the draw bar.

A still further object of the present invention is to permit the securing of the projection extending into the ball receiving region so as to mount in an overlying relation to the yoke pivot member found in such trailer hitch couplers.

The above objects and others, however, will become more apparent upon directing attention to the following description of the present invention with respect to the following apended drawings. Before referring thereto, though, it is to be recognized that the following description is made with respect to the presently preferred embodiment only, as well as with respect to various presently contemplated modifications, but that still other modifications within the scope of the invention are still possible.

SUMMARY OF THE INVENTION

A lock mechanism for use with a trailer's ball hitch coupler in which a U-shaped member having one or more cruciform shaped slots formed in opposed side legs for receiving a reinforced draw bar of a T-shaped cross-section insertable therethrough is disclosed. A housing to one side member shields the lock receiving end of the draw bar and a slot formed therein, such that the shackle of the padlock mounts within the slot and is contained between the shackle and lock body, upon closing and locking the padlock. The padlock, in turn, is protected by the lock housing.

Attached to the bottom of the U-shaped member is an upwardly-rising second U-shaped member one leg of which is insertable into the ball receiving region of a ball-type trailer hitch coupler. A projection on the other leg of the second member mounts about the yoke pivot of the trailer hitch coupler and loosely secures the assembly to the trailer hitch coupler, during the locking of the draw bar. The configuration and construction of the assembly are further developed to prevent or hamper removable by prying, hammering or cutting.

BRIEF DESCRIPTION OF THE DRAWINGS

FIG. 2 shows an end view of the assembly relative to a conventional ball-type trailer hitch coupler.

FIG. 3 shows a top view taken along lines 3—3 of FIG. 2.

FIG. 4 shows a cross-sectional side view taken along lines 4—4 of FIG. 2.

DESCRIPTION OF THE PREFERRED EMBODIMENT

Figure 1:
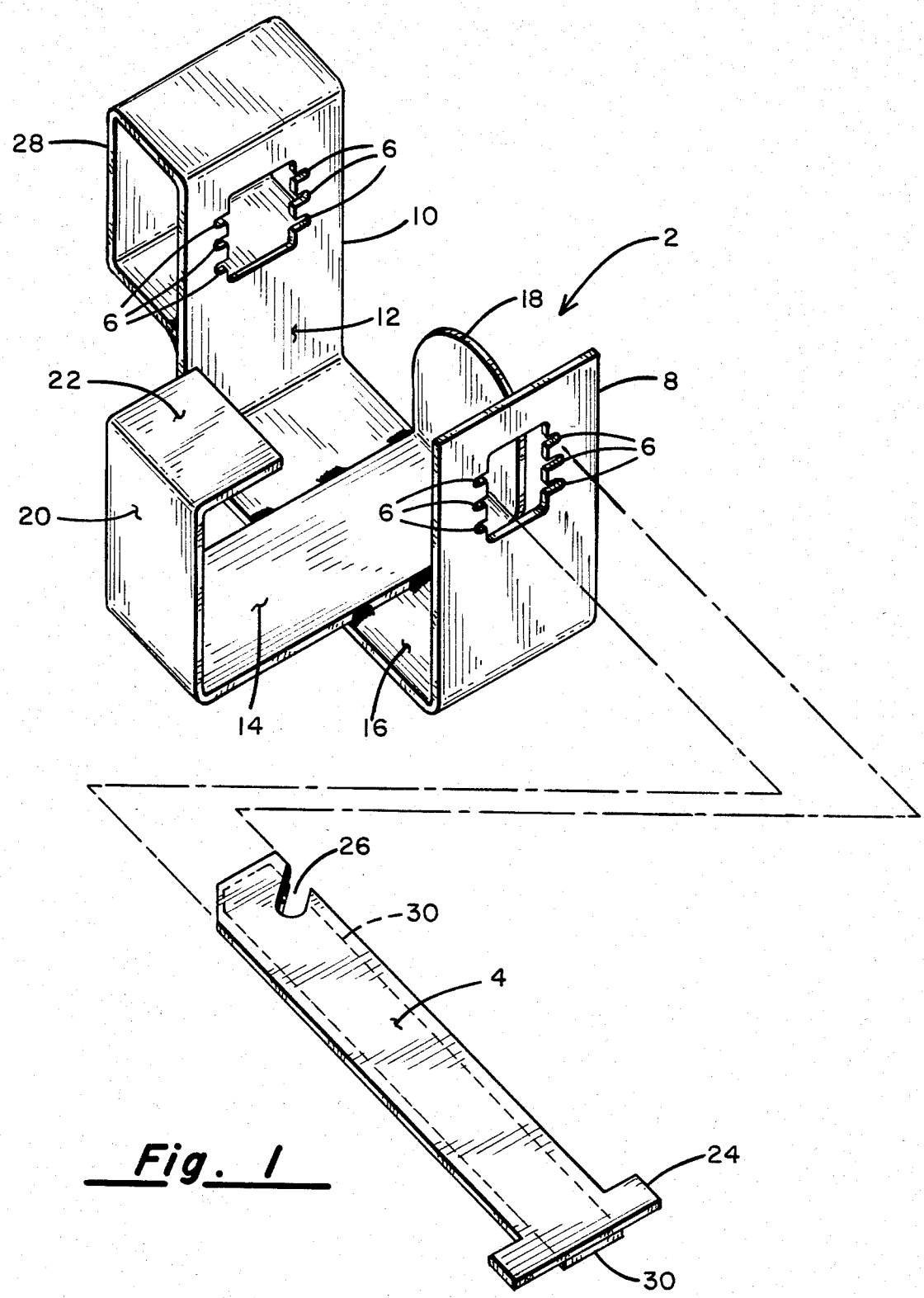
FIG. 1 shows an exploded perspective view of the present assembly and the mounting relation of the dead bolt thereto.

Referring to FIG. 1, an exploded perspective view is shown of the present trailer hitch coupler locking assembly 2 and the mounting relation of the T-shaped dead bolt 4 relative to a plurality of slots 6 cut into the spaced-apart legs 8 and 10 of a U-shaped member 12. Generally, the assembly 2 is comprised of the U-shaped member 12 and a U-shaped hook member 14 that is preferredly weldably secured to the generally flat bottom 16 of the member 12. The member 14 is rotated approximately 90 degrees relative to the member 12 with its upwardly extending legs 18 and 20 rising to a height less than that of the legs 8 and 10. The U-shaped member 14 is dimensioned such that it mounts within the ball receiving region of a ball-type trailer hitch coupler, such that the leg 18 projects into and blocks or occludes the ball receiving socket thereof, with the leg 20 and the bent terminal projection 22 thereof disposed rearwardly such that the terminal projection 22 is positioned above the hitch's yoke pivot rod which typically secures the yoke within a typical ball-type trailer hitch coupler. Thus, during the mounting of the present assembly 2, it must necessarily be canted slightly so as to permit the projection 22 to be mounted above the pivot member and yoke and after which the assembly 2 is rotated and thus suspended from the trailer hitch coupler.

The T-shaped dead bolt may then be inserted through selected ones of the slots 6 so as to be as snug as possible with respect to the upper exteriors of the trailer hitch coupler to minimize against any play in the mounting. The extent of insertion of the dead bolt 4 is determined by its T-shaped head 24 which typically is such as to place the angled slot 26 just within the formed padlock housing 28 at the leg 10. An open padlock may then be inserted into the housing 28 and its shackle may be slipped over the end of the dead bolt and aligned with the slot 26. When the padlock is snapped shut, the lock's shackle enters the slot 26 and the dead bolt 4 is captured between the shackle and lock body. The padlock thus secures the assembly 2 to the trailer hitch coupler and prevents against the mounting of the trailer to an unauthorized vehicle. Further, due to the novel configuration of the present assembly, each potential pry point is protected against prying and the padlock is protected against cutting by a bolt snips or the like.

In the latter regard, it is to be noted that the padlock housing 28 is formed to allow a padlock of a standard size to be fitted within it and to permit the mounting of the shackle of this padlock over the dead bolt and into the slot 26. The housing, however, precludes the access of a bolt cutter or pry bar on the padlock itself. Due to the angulation of the slot 26, the dead bolt 4 tends to be snubbed via a wedging action, upon closing the lock shackle. Also, it is to be noted that a reinforcing member 30 of somewhat lesser widths than the dead bolt itself is welded to one side of the dead bolt, it becomes nonsymmetrical. Hence, depending upon the orientation of the dead bolt as it is fitted through the aligned cruciform slots in the legs of the U-shaped member 12, a further adjustment can be had in the forming of a tight fit between the assembly 2 and the trailer tongue.

Directing attention next to FIG. 2, an end view is shown of the assembly 2 relative to its mounting to a typical ball-type trailer tongue coupler assembly 32 (shown in phantom). Further, it should be apparent from FIG. 2 that because of the configuration of the assembly 2, it is not dependent upon the size of ball (e.g. 1⅞ or 2 inches) for which the hitch coupler 32 is intended, since the U-shape member 14 (FIG. 1) can be sized to mount within tongues adaptable to either of these ball sizes while still providing a positive attachment thereto. Also, it is to be noted that the vertical positioning of the assembly 2 can be adjusted by selecting a desired one of the slots 6 and/or by turning the dead bolt 4 so as to minimize the space between the bottom 16 and the bottom of the trailer tongue coupler 32. Any play in the assembly 2 is thus minimized to predominantly a lateral motion, but which also is minimized by proper attention to the space allowed between the legs 8 and 10 or to the width of the member 14.

Attention is now directed to FIG. 3 wherein a top view taken along lines 3—3 of FIG. 2 is shown. With reference to this figure, a better perspective can be gained as to the manner of mounting the present locking assembly in relation to the hand-tightening knob of the trailer tongue coupler 32. This view also illustrates the mounting of the padlock 36 in relation to the dead bolt 4. From FIG. 3, it is to be noted that the width of the member 12 is approximately the same as that of a typical trailer ball (i.e. 2″) and that the side legs 18 and 20 of the hook member control its lengthwise alignment relative to the trailer tongue coupler 32 so as to mount forward of the hand tightening knob 34.

Shown in dotted-line in FIG. 3 is the padlock 36 and its positioning relative to the dead bolt in the lock housing 28. Specifically, it is to be noted that the slot 26 is cut into the dead bolt to a depth such that upon locking the padlock 36, the lock is prevented from being removed by pushing the lock forward, since the space between the lock body and dead bolt is less than the depth of the groove 26. Also, because the draw bar is contained within the shackle and because of the generally central mounting of the dead bolt within the housing 28, a would-be thief is prevented from inserting a pry bar in the shackle.

Finally, attention is directed to FIG. 4 which depicts a cross-sectional view or side view taken along lines 4—4 of FIG. 2. FIG. 4 shows the mounting relation of the bent projection 22 of the hook member relative to the yoke 38 and yoke pivot member 40 of the typical ball-type trailer hitch coupler. By adjusting the length of the projection 22, relative to the distance between the dead bolt and the hand tightening knob 34 during the manufacture of the present assembly 2, the present invention ensures that the locking assembly 2 cannot be removed from the trailer tongue coupler 32 by inserting a pry bar at the front of the trailer tongue in attempting to pry the assembly 2 rearwards. Furthermore, dimensional tolerances do not permit the insertion of a pry bar inside of the trailer tongue so as to permit the levering of the side member 20 and/or projection 22 away from the pivot member 40. In short, each potential pry point is protected by mounting the pry point within either the trailer tongue coupler 32 or within the padlock enclosure 28. In this fashion, potential theft is discouraged and even if attempted, the would-be-thief will be delayed for a sufficient amount of time so as to improve the likelihood of detection.

While the present invention has been described with respect to its presently preferred embodiment and various modifications thereto, it is to be recognized that still other modifications might suggest themselves to those of skill in the art. Accordingly, it is contemplated that the breadth of the following claims should be interpreted so as to include all those equivalent embodiments within the spirit and scope thereof.

What is claimed is:

1. Anti-theft apparatus for a towable trailer of the type including a ball-type trailer hitch coupler defining a ball-receiving socket and having a yoke hinged for limited rotational motion about a pivot pin upon rotation of a hand-tightening knob, comprising in combination:
   a first U-shaped member having a pair of parallel, spaced apart legs mountable about the tongue of a towed trailer and having at least one pair of aligned apertures formed through said legs;
   a dead bolt having a generally rectangular cross-section and a transversely extending head member formed at one end thereof and having a lateral slot extending inwardly from one edge surface of said dead bolt proximate the end of said dead bolt opposite said head member, said slot being of a width to receive the shackle portion of a padlock;
   hook means affixed to said U-shaped member and mountable within said ball-receiving socket of said ball-type trailer hitch coupler and including an inwardly turned projection for mounting about said pivot pin of said trailer hitch coupler; and
   housing means affixed to one of said legs of said U-shaped member overlaying the said apertures in said one of said legs such that the slot containing end of said dead bolt is received therein for enclosing the shackle portion of said padlock when fastened about said dead bolt and entered in said slot.

2. Apparatus as set forth in claim 1 wherein said hook means comprises a second U-shaped member mounted orthogonal to said first U-shaped member having first and second upwardly extending side members and one of which side members includes said inwardly turned projection for mounting about said yoke pivot pin.

3. Apparatus as set forth in claim 1 wherein said housing means comprises a formed extension of one of said legs of said first U-shaped member, said extension being bent back upon itself so as to enclose said shackle portion of said padlock when said dead bolt is passed through said pair of aligned apertures and said padlock is closed with said shackle in said slot.

4. Apparatus as set forth in claim 1 wherein said dead bolt is comprised of a laminated elongated metallic member.

5. Anti-theft apparatus for a towable trailer of the type having a hitch coupler with a ball-receiving socket and a pivotal yoke supported by a transversely extending pivot pin comprising, in combination:

(a) a generally U-shaped member having a pair of parallel legs spaced from one another by a distance slightly greater than the width of said hitch coupler at said ball-receiving socket, said legs being of a length which is greater than the height of said hitch coupler proximate said ball-receiving socket, each of said legs having at least one cruciform shaped aperture formed therethrough, said apertures in each of said legs being generally aligned with one another;

(b) a generally flat, elongated, laminated dead bolt means having a cross-sectional shape insertable through said cruciform apertures, a transversely extending head larger than said apertures at one end of said dead bolt means and a lateral slot extending inwardly from one edge surface of said dead bolt at a predetermined angle;

(c) ball-receiving socket occluding means fixedly attached to the base of said U-shaped member and having an integrally formed, inwardly directed hook segment for engagement with said transversely extending pivot pin for preventing rotation of said generally U-shaped member when said ball-receiving socket occluding means is disposed within said socket and said dead bolt means is inserted through said aligned apertures.

* * * * *

UNITED STATES PATENT AND TRADEMARK OFFICE
CERTIFICATE OF CORRECTION

PATENT NO. : 4,538,827
DATED : September 3, 1985
INVENTOR(S) : John W. Plifka

It is certified that error appears in the above-identified patent and that said Letters Patent are hereby corrected as shown below:

Column 5, Line 2, "yoke" should be deleted.

Signed and Sealed this

Twenty-sixth Day of November 1985

[SEAL]

Attest:

Attesting Officer

DONALD J. QUIGG

Commissioner of Patents and Trademarks